United States Patent
Poulin

Patent Number: 5,522,771
Date of Patent: Jun. 4, 1996

[54] AXIALLY FIXED TRANSMISSION JOINT

[75] Inventor: Bernard Poulin, Conflans Ste Honorine, France

[73] Assignee: GKN Automotive AG, Lohmar, Germany

[21] Appl. No.: 97,278

[22] Filed: Jul. 23, 1993

[30] Foreign Application Priority Data

Jul. 24, 1992 [FR] France .................................. 92 09180

[51] Int. Cl.$^6$ .................................................. F16D 3/205
[52] U.S. Cl. .................................. 464/111; 277/212 FB; 464/133; 464/905
[58] Field of Search ..................... 464/111, 133, 464/173, 124, 175, 905, 906; 277/212 FB, 212 C, 212 R, 215

[56] References Cited

U.S. PATENT DOCUMENTS

| | | | |
|---|---|---|---|
| 3,287,934 | 5/1964 | Asher . | |
| 3,296,834 | 1/1967 | Grauel . | |
| 3,643,468 | 2/1972 | Kleinschmidt et al. . | |
| 3,707,852 | 1/1973 | Burckhardt et al. . | |
| 3,807,195 | 4/1974 | Faulbecker | 464/173 |
| 4,083,202 | 4/1978 | Westercamp | 464/175 |
| 4,369,979 | 1/1983 | Krude et al. | 277/212 FB |
| 4,392,838 | 7/1983 | Welschof et al. | 464/175 |
| 4,403,781 | 9/1983 | Riemscheid | 464/175 |
| 4,507,100 | 3/1985 | Doré et al. . | |
| 4,630,834 | 12/1986 | Müller et al. | 277/212 FB |
| 4,778,026 | 10/1988 | Uchida et al. . | |
| 4,946,303 | 8/1990 | Sawicki . | |
| 5,176,576 | 1/1993 | Moulindt | 277/212 FB |
| 5,222,912 | 6/1993 | Moulinet | 277/212 FB |
| 5,230,660 | 7/1993 | Warnke | 277/212 FB |
| 5,297,996 | 3/1994 | Draga | 464/175 |

FOREIGN PATENT DOCUMENTS

| | | |
|---|---|---|
| 0023246 | 5/1980 | European Pat. Off. . |
| 1439507 | 4/1966 | France . |
| 2416811 | 9/1979 | France . |
| 2655102 | 5/1991 | France . |
| 591146 | 8/1947 | United Kingdom . |
| 874483 | 11/1957 | United Kingdom . |

*Primary Examiner*—Daniel P. Stodola
*Assistant Examiner*—Eileen A. Dunn
*Attorney, Agent, or Firm*—Harness, Dickey & Pierce

[57] ABSTRACT

The transmission joint comprises a joint body (12) connected to a first shaft and defining a cavity (14) in which are formed a plurality of rolling ways (26) in each of which is received a rolling element (24) connected to a second shaft (18), and a member (30) for axially retaining the joint body (12) relative to the second shaft (18), this member (30) being elastically deformable whereby to permit the inclination of the axis of rotation (X—X) of the first shaft relative to the axis of rotation (Y—Y) of the second shaft, this member (30) constituting a sealed partition wall closing the cavity (14) on one of the sides of the latter. The cavity (14) is filled with an incompressible fluid and the member (30) is incapable of being axially deformed under the effect of the resultant of the pressure forces to which it is subjected which result from an axial biasing of one of the shafts relative to the other.

9 Claims, 1 Drawing Sheet

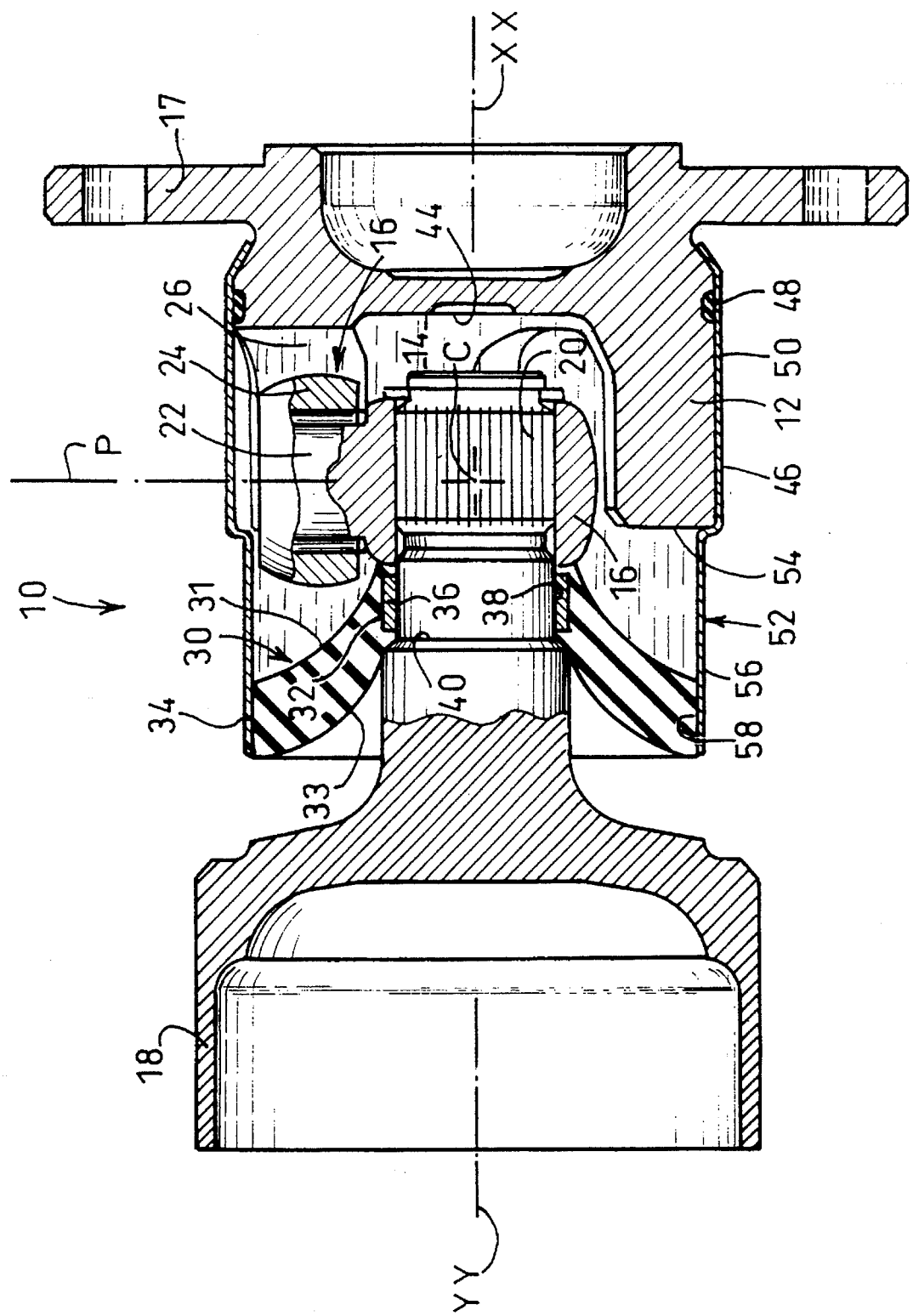

AXIALLY FIXED TRANSMISSION JOINT

The present invention relates to a transmission joint of the type comprising a body which is connected to a first shaft and defines a cavity in which are formed a plurality of rolling ways in each of which a rolling element connected to a second shaft is received.

Many transmission joints of this type are known and in particular the homokinetic joints for which it is necessary to ensure that one shaft is axially substantially fixed relative to the other while allowing the greatest possible freedom of articulation of the transmission joint so that the latter can operate at an angle.

Many solutions have been proposed which mostly consist in providing axial abutment means in both directions which are independent from each other or grouped in a common assembly and which have for drawback to produce, owing to their design, shock phenomena which adversely affect good operation of the joint and produce undesirable noises or premature wear phenomena with resulting axial play.

In order to overcome this drawback, there has already been proposed in the document FR-A-2,655,102 a transmission joint comprising retaining means for axially retaining the joint body relative to the second shaft so that the position of the first shaft relative to the second shaft in the axial direction is substantially constant, the retaining means comprising an element which is elastically deformable so as to permit the inclination of the axis of rotation of the first shaft relative to the axis of rotation of the second shaft, which has two inner and outer connection surfaces, respectively connected to the second shaft and to the transmission joint body, and which constitutes a partition wall closing the cavity on one of its sides.

The design and construction of such an axial retaining element, which is in the form of an elastic annular diaphragm, are complex and it is in particular difficult to achieve a satisfactory compromise between the required possibilities of deformation of the diaphragm so that it can satisfy the conditions of articulation of the joint and a sufficient axial stiffness of the diaphragm so that it can perform its function of an axial retaining element.

In order to overcome the drawbacks just mentioned, the invention provides a transmission joint of the aforementioned type, characterized in that the cavity filled with an incompressible fluid and the elastically deformable element is incapable of being axially deformed under the effect of the resultant of the pressure forces to which it is subjected and which result from an axial biasing of one of the shafts relative to the other.

According to other features of the invention:

in the absence of an axial biasing of one of the shafts relative to the other, the instantaneous centre of rotation of the elastically deformable element is substantially coincident with the geometric centre of articulation of the joint, irrespective of the operating angle of the joint;

the inner connection surface of the elastically deformable element is connected to the second shaft on the side of the articulation element axially opposed to the end of this shaft which enters the cavity;

the inner connection surface is mounted on a corresponding bearing surface of the second shaft with respect to which it is axially immobilized;

the outer connection surface is connected to the transmission joint body in the vicinity of the free edge of the cavity;

the outer connection surface is mounted on a corresponding bearing surface of the transmission joint body;

the bearing surface of the joint body is formed in a sleeve closing the cavity; and the closing sleeve is cooperative in a sealed manner with a complementary surface portion of the joint body.

Further features and advantages of the invention will be apparent from the following detailed description with reference to the accompanying drawing the single FIGURE of which is an axial sectional view of a transmission joint arranged in accordance with the teaching of the invention.

Shown in the Figure is a tripod homokinetic transmission joint 10 of the type comprising a transmission joint body 12, also termed bell or barrel, having a generally cylindrical shape and internally defining a cavity 14 in which the tripod element 16 is received.

The body 12 has a flange 17 for connection to a first shaft (not shown) which has an axis of rotation X—X and for which the joint provides a transmission connection with a second shaft 18 on the splined end portion 20 of which the tripod element 16 is mounted.

In the known manner, the tripod element 16 comprises three arms 22 on each of which is for example mounted an articulation element in the form of a spherical roller 24.

Each spherical roller 24 is rollingly received in a rolling way formed in the body 12 and constituted by two rolling tracks or races 26 having complementary profiles.

In the position shown in the Figure, i.e. in the aligned position of the transmission joint 10, the axis Y—Y of the second shaft 18 and the axis X—X common to the first shaft and the joint body 12 are coincident.

The joint according to the invention is a joint said to have an axial fixity, or substantially an axial fixity, i.e. it comprises means for opposing any relative axial displacement of the two transmission shafts and therefore of the median plane P of the tripod element 16 relative to the joint body 12.

The axial retaining means comprise an elastically deformable element 30.

The elastically deformable element 30, which is for example made from rubber or an elastomeric material, is an element having an axisymmetrical annular shape or a shape of revolution which defines two coaxial cylindrical connection surfaces, namely an inner surface 32 and an outer surface 34 respectively.

The inner cylindrical connection surface 32 is bonded or vulcanized to an inner annular ring 36.

The inner ring 36 of the elastically deformable element 30 is a tight fit on a cylindrical bearing surface 38 of the second shaft 18, between a radial shoulder 40 of the latter and a confronting lateral radial surface of the central body of the tripod element 16.

The inner cylindrical connection surface is thus connected to the second shaft 18 on the side of the rollers 24 which is axially opposed to the free end 20 of the second shaft 18 which is disposed in the cavity 14 in facing relation to the inner end 44 of the latter.

The transmission joint body 12 defines a peripheral cylindrical surface portion 46 on which is mounted with a tight and sealed fit by means of a sealing element 48, a complementary cylindrical portion 50 of a closing sleeve 52 made from sheet metal.

The sleeve 52 is axially extended from its cylindrical portion 50 and beyond the axial end face 54 of the body 12 by a second cylindrical portion 56 whose inner cylindrical surface 58 constitutes a bearing surface on which is bonded or vulcanized the outer connection surface 34 of the elastically deformable element 30.

The elastically deformable element 30 is a solid element, i.e. it constitutes a sealed partition wall for closing the cavity 14 at the end of the cavity remote from the inner end 44.

According to the invention, the sealed cavity 14 is completely filled with an incompressible fluid which is for example a lubricant, such as the grease lubricating the joint.

According to the invention, the elastically deformable diaphragm 30 is so designed as to resist the resultant of the pressure forces to which it is subjected when one of the two shafts is biased or urged relative to the other in the axial direction common to these two shafts.

The diaphragm 30 thus behaves in the same way as a slidable piston of a jack whose working chamber 14 would be closed in a sealed manner and completely filled with an incompressible fluid, it being impossible for the piston to move relative to the body of the jack.

Indeed, if the shaft 18 is axially biased in the compressing direction, in which its end 20 is biased toward the inner end 44 of the cavity 14, this movement is rendered impossible since the diaphragm 30 does not deform owing to the effect of the increase in the pressure inside the cavity 14, the pressure forces being exerted on its inner surface 31.

On the other hand, if the shaft 18 is subjected to a pull, i.e. biased toward the left as viewed in the Figure, the atmospheric pressure exerted on the outer surface 33 of the diaphragm 30, and the fact that the diaphragm is substantially undeformable in the axial direction, oppose this displacement of the shaft.

The bearing surface 58 extends, in the aligned position of the joint, coaxially with the inner bearing surface 38 formed on the second shaft 18, it being axially slightly offset toward the left relative to the inner bearing surface 38, as viewed in the Figure.

In axial section, the diaphragm 30 has a concave curvature on its surface facing the interior of the cavity 14.

Owing to this feature, the elastically deformable element 30 is so designed that its instantaneous centre of rotation is always coincident with the geometric centre C of the homokinetic joint, irrespective of the angle of operation of the joint.

Further, this particular shape imparts a higher axial stiffness thereto.

It must be understood that the scope of the invention is not intended to be limited to the embodiment of the elastically deformable element just described, nor to the ways in which it is connected to the second shaft 18 and to the body 12.

Bearing in mind that the elastically deformable element 30 also has for purpose to ensure an operation equivalent to that of a non-rotating elastic bearing or bush having high flexibility in directions of deformation other than the axial direction, all designs achieving this type of operation fall within the scope of the present invention.

It must be understood that the scope of the invention is not intended to be limited to a homokinetic joint employing rollers but is also applicable to joints employing balls.

The invention also concerns axially fixed or substantially fixed homokinetic joints used in particular for rear lateral transmissions or longitudinal transmissions located between the engine unit and the rear axle or a gearbox transferring motion to the latter.

Further, it is possible to impart to the deformable element 30 mounted between the shaft 18 and the body 12 an elasticity in rotation about its axis of revolution which permits automatically taking up angular play existing between the tripod element and the body 12, thereby avoiding noises when starting up.

The outer cylindrical surface of the element 30 may be directly connected to a cylindrical bearing surface formed in the body 12 and not in the closing sleeve.

What is claimed is:

1. Transmission joint comprising in combination: a first shaft element having an axis of rotation, a second shaft element having an axis of rotation, a transmission joint body connected to said first shaft element and defining a cavity, a plurality of rolling ways formed inside said cavity, articulation elements connected to said second shaft element and each received in a respective one of said rolling ways, and retaining means for axially retaining said joint body relative to said second shaft element whereby the position of said first shaft element relative to said second shaft element in the axial direction is substantially constant, said retaining means comprising a member which is elastically deformable so as to permit an inclination of said axis of rotation of said first shaft element relative to said axis of rotation of said second shaft element, said member having an inner connection surface connected to said second shaft element and an outer connection surface connected to said joint body, said inner connection surface is mounted on a corresponding bearing surface of said second shaft element, said inner connection surface is axially immobilized with respect to said bearing surface, said member constituting a wall closing said cavity adjacent an end of said cavity, and an incompressible fluid completely filling said cavity, said member being substantially incapable of being axially deformed under the effect of the resultant of pressure forces to which said member is subjected, said pressure forces resulting from an axial biasing of one of said shaft elements relative to the other shaft element.

2. Transmission joint according to claim 1, wherein, in the absence of an axial biasing of one of said shaft elements relative to the other shaft element, the instantaneous centre of rotation of said member is substantially coincident with the geometric centre of articulation of said joint irrespective of the angle of operation of said joint.

3. Transmission joint according to claim 1, wherein said inner connection surface is connected to said second shaft element on the side of said articulation element axially opposed to an end of said second shaft element which extends into said cavity.

4. Transmission joint according to claim 1, wherein said outer connection surface is connected to said body in the vicinity of a free edge of said cavity.

5. Transmission joint according to claim 1, comprising a bearing surface carried by said body, said outer connection surface being mounted on said bearing surface.

6. Transmission joint according to claim 5, comprising a sleeve closing said cavity, mounted on said body and defining said bearing surface.

7. Transmission joint according to claim 6, wherein said sleeve is mounted in a sealed manner on a complementary surface portion of said body.

8. Transmission joint according to claim 1, wherein, in axial section, said member has a concave curvature facing said cavity.

9. Transmission joint comprising in combination: a first shaft element having an axis of rotation, a second shaft element having an axis of rotation, a transmission joint body connected to said first shaft element and defining a cavity, a plurality of axially extending rolling ways formed inside said cavity, articulation elements connected to said second shaft element and each received in a respective one of said rolling ways, and retaining means for axially retaining said joint body relative to said second shaft element whereby the position of said first shaft element relative to said second shaft element in the axial direction is substantially constant, said retaining means comprising a member which is elastically deformable so as to permit an inclination of said axis of rotation of said first shaft element relative to said axis of rotation of said second shaft element, said member having an inner connection surface connected to said second shaft element and an outer connection surface connected to said joint body, said inner connection surface is mounted on a corresponding bearing surface of said second shaft element with respect to which bearing surface is axially immobilized with respect to said bearing surface, said member constituting a wall closing said cavity adjacent an end of said cavity, and an incompressible fluid completely filling said cavity, said member being substantially incapable of being axially deformed under the effect of the resultant of pressure forces to which said member is subjected, said pressure forces resulting from an axial biasing of one of said shaft elements relative to the other shaft element.

* * * * *